H. B. KEIPER.
ROLLER BEARING.
APPLICATION FILED JULY 19, 1910.
997,829.
Patented July 11, 1911.
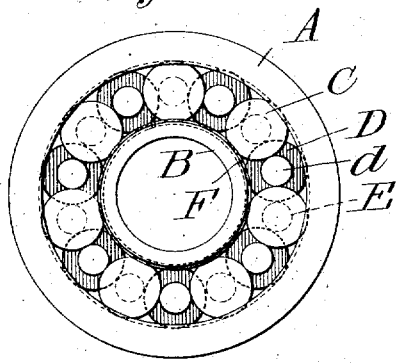
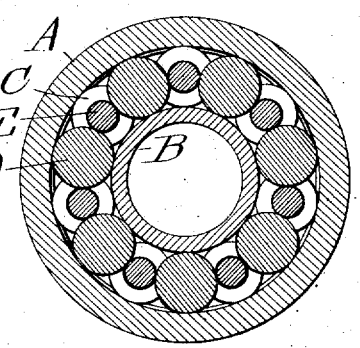
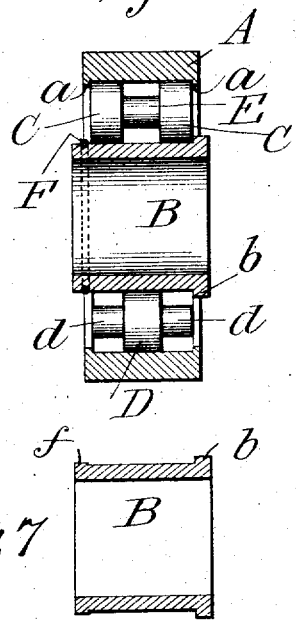
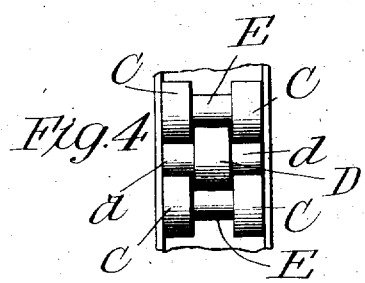
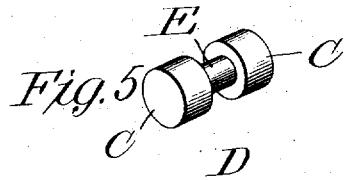
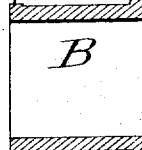
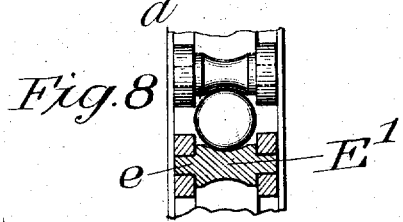
Witnesses
Joseph C. Stack
Donald H. Stewart
Inventor
Henry B. Keiper
By Donell Littwell
his Attorneys

UNITED STATES PATENT OFFICE.

HENRY BUISER KEIPER, OF LANCASTER, PENNSYLVANIA.

ROLLER-BEARING.

997,829.  Specification of Letters Patent.  Patented July 11, 1911.

Application filed July 19, 1910. Serial No. 572,759.

*To all whom it may concern:*

Be it known that I, HENRY B. KEIPER, a citizen of the United States, residing at Lancaster, in the county of Lancaster and State of Pennsylvania, have invented certain new and useful Improvements in Roller-Bearings, of which the following is a specification.

This invention relates to anti-friction bearings of that type in which balls or rollers are used in annular series between concentric rings or bearing members for sustaining radial pressure or thrust, and which are known in the art as annular ball or roller bearings.

The object of the invention is to provide an improved bearing of the type referred to in which several rows of rollers are assembled in compact form between concentric rings or bearing members and adapted to sustain radial pressure; the rollers of one row serving as separators to keep the rollers of other rows apart, and the bearing being independent of the structure in which it is designed to be used and capable of being handled as a unit, without requiring special fittings or fastening devices such as are ordinarily employed for holding the parts together and preventing the rollers from dropping out, the device being adapted for general application and use wherever such bearings are required.

The invention will first be hereinafter more particularly described, with reference to the accompanying drawings, which are to be taken as a part of this specification, and then pointed out in the claims at the end of the description.

Figure 1 represents a side elevation of a roller embodying my invention; Fig. 2 is a vertical sectional elevation of the same; Fig. 3 is a transverse section; Fig. 4 is a detail fragmentary view; Fig. 5 is a perspective view of one of the double or axially connected rollers; Fig. 6 is a detail perspective view of a single roller; Fig. 7 is a detail sectional view of a modification of the inner bearing member or sleeve; and Fig. 8 is a detail sectional view showing a modification in which the rollers are loose upon their axial connections, which serve as idlers for separating a middle row of balls.

Referring to the drawings, in which the same reference letters are used to denote corresponding parts in different views, the letter A denotes an outer cylindrical bearing member and the letter B an inner bearing member or sleeve, and between said members are placed several annular series of rollers, which are denoted by the letters C and D. The outer rollers C, are double or connected in pairs by axial portions E, or in other words, a double circular series of roller-surfaces C are carried by a circular series of axes E, and the intermediate rollers D extend into the recesses between adjacent outer rollers and their axial connections, and serve as separators for the outer rollers. The intermediate rollers have axial projections or pintles $d$, which extend between adjacent rollers of the outer rows and serve as separators therefor. The outer ring or bearing member A, has a smooth inner side or bearing surface and marginal inwardly extending flanges $a$, $a$, thus providing a suitable raceway for the several annular series of rollers between said flanges, which latter prevent endwise movement of the rollers or sleeve. The several series of rollers are thus compactly arranged and practically fill the entire space between the confronting surfaces of the bearing members, and the pressure is distributed over the entire surface, each roller carrying a part of the load. The rollers of each row also serve as a means for separating the rollers of another row. The inner ring or sleeve B has a smooth exterior bearing surface and is formed or provided at one end with an exterior annular flange $b$, and at the other end with an annular recess into which, when the sleeve is inserted in the opening encircled by the rollers, a spring F may be "snapped" to prevent the sleeve from being withdrawn, the flange $b$ serving to prevent endwise movement in one direction and the spring F preventing endwise movement in the opposite direction, thus preventing separation of the parts in handling or when the structure is removed from the bearings.

A modified form of sleeve is shown in Fig. 7 with means to prevent accidental displacement or withdrawal, consisting of a slightly raised portion $f$ at the end of the sleeve opposite the flange $b$, which raised portion is a little larger in diameter than the diameter of the sleeve between said part $f$ and flange $b$, so that the sleeve may be inserted through the opening formed by the rollers by pressure sufficient to force the rollers over said raised portion, by virtue of the resiliency of the metal of which the two rings are composed.

I thus provide a very simple, efficient and durable multiple row roller bearing, in which the pressure or weight is evenly distributed and borne by all the rollers, and the several parts may be easily assembled and held together without special fittings or fastenings such as are ordinarily employed in this class of devices, and which are liable to work loose and injure the bearings, particularly devices composed of separable parts secured together by means of screws that are liable to work loose and drop out. The space between the rings is practically filled with rollers and the rollers of each row are kept in perfect alinement in the raceway provided by the bearing surface between the flanges of the outer ring, or vice versa. It might be desirable in some cases to use balls instead of rollers for the intermediate annular series, in which case the outer series of rollers may be provided with axial portions $E^1$ having pintles $e$ on which the rollers are loosely fitted, as shown, for example, in Fig. 8 of the drawings. While such intermediate series of balls preferably are of the same diameter as the rollers, so as to sustain pressure and at the same time serve as a means for separating the rollers, they might be of reduced size to adapt them to serve solely as a means for separating adjacent pairs of rollers, in which case, the balls would be loosely confined between adjacent pairs of rollers and their loose axial connections, so that the latter will serve as idlers enabling the balls to freely rotate in a direction opposite to the direction of rotation of the rollers.

Various changes in details might be made without departing from the spirit and scope of my invention; hence I do not desire to be limited to the particular construction shown, although the forms illustrated are desirable and well adapted to produce the desired results.

Having thus described my invention, what I claim as new and desire to secure by Letters Patent of the United States is:

1. A unit-structure bearing comprising concentric ring-shaped bearing members, a circular series of axes between said members carrying a double circular series of roller-surfaces, a circular series of roller-elements between said double circular series of roller-surfaces having peripheral contact individually with the axes of adjacent pairs of roller-surfaces for holding them apart, the outer bearing member having on its inner side annular marginal flanges confining said roller-surfaces therebetween, and the inner bearing member having at opposite ends an exterior flange and means abutting said roller surfaces and together with said flanges holding the assembled parts together, said means adapting the inner member to be drawn out and thereby permit the bearing to fall apart.

2. A unit-structure bearing comprising outer and inner cylindrical bearing members, the outer member having on the inner side thereof a smooth bearing surface and annular marginal flanges, and the inner member having a flange at one end, a slightly raised portion at the other end, and an intermediate smooth bearing surface, and anti-friction devices arranged in circular series between said members, there being two outer series of said devices having axial connections, and an intermediate series serving as separators for the outer series by contact with said axial connections, the several series being held together solely by the marginal flanges of the outer bearing member and the end flange and slightly raised portion of the inner bearing member, and being adapted to fall apart when said inner member is forcibly withdrawn, such withdrawal being permitted by said slightly raised portion of the inner member forcing its way through the circular series of anti-friction devices.

3. In combination, concentric ring-shaped bearing members, the outer member having on its inner side annular marginal flanges, a multiple circular series of roller-surfaces between said members having axial connections, a circular series of anti-friction devices holding said roller-surfaces apart by peripheral contact with the axes of adjacent pairs, said inner bearing member having means thereon at opposite ends abutting the outer margins of said roller surfaces and together with said flanges holding the assembled parts together, said inner bearing member being adapted to be drawn out and thereby permit the bearing to fall apart.

4. A unit-structure bearing consisting of an outer ring having marginal flanges on its inner side, an inner ring, a multiple circular series of roller-elements between said rings, two of said series having loose axial connections and an intermediate series having contact individually with said axial connections for holding adjacent pairs of rollers apart, said inner ring having a slightly raised portion at one end adapting it to be forcibly inserted through the opening between the multiple circular series of roller-elements, and a flange at the other end thereof between which and said raised portion the roller elements are confined and held together.

In testimony whereof I affix my signature, in presence of two witnesses.

HENRY BUISER KEIPER.

Witnesses:
C. B. LONG,
GEO. HAMMOND.

---

Correction in Letters Patent No. 997,829.

It is hereby certified that in Letters Patent No. 997,829, granted July 11, 1911, for an improvement in "Roller-Bearings," the name of the patentee was erroneously written and printed "Henry Buiser Keiper," whereas said name should have been written and printed *Henry Brinser Keiper;* and that the proper corrections have been made in the files and records of the office and are hereby made in said Letters Patent.

Signed and sealed this 23d day of January, A. D., 1912.

[SEAL.]

C. C. BILLINGS,
*Acting Commissioner of Patents.* apart, said inner ring having a slightly raised portion at one end adapting it to be forcibly inserted through the opening between the multiple circular series of roller-elements, and a flange at the other end thereof between which and said raised portion the roller elements are confined and held together.

In testimony whereof I affix my signature, in presence of two witnesses.

HENRY BUISER KEIPER.

Witnesses:
C. B. LONG,
GEO. HAMMOND.

Correction in Letters Patent No. 997,829.

It is hereby certified that in Letters Patent No. 997,829, granted July 11, 1911, for an improvement in "Roller-Bearings," the name of the patentee was erroneously written and printed "Henry Buiser Keiper," whereas said name should have been written and printed *Henry Brinser Keiper;* and that the proper corrections have been made in the files and records of the office and are hereby made in said Letters Patent.

Signed and sealed this 23d day of January, A. D., 1912.

[SEAL.]

C. C. BILLINGS,

*Acting Commissioner of Patents.*

It is hereby certified that in Letters Patent No. 997,829, granted July 11, 1911, for an improvement in "Roller-Bearings," the name of the patentee was erroneously written and printed "Henry Buiser Keiper," whereas said name should have been written and printed *Henry Brinser Keiper;* and that the proper corrections have been made in the files and records of the office and are hereby made in said Letters Patent.

Signed and sealed this 23d day of January, A. D., 1912.

[SEAL.]

C. C. BILLINGS,
*Acting Commissioner of Patents.*